UNITED STATES PATENT OFFICE.

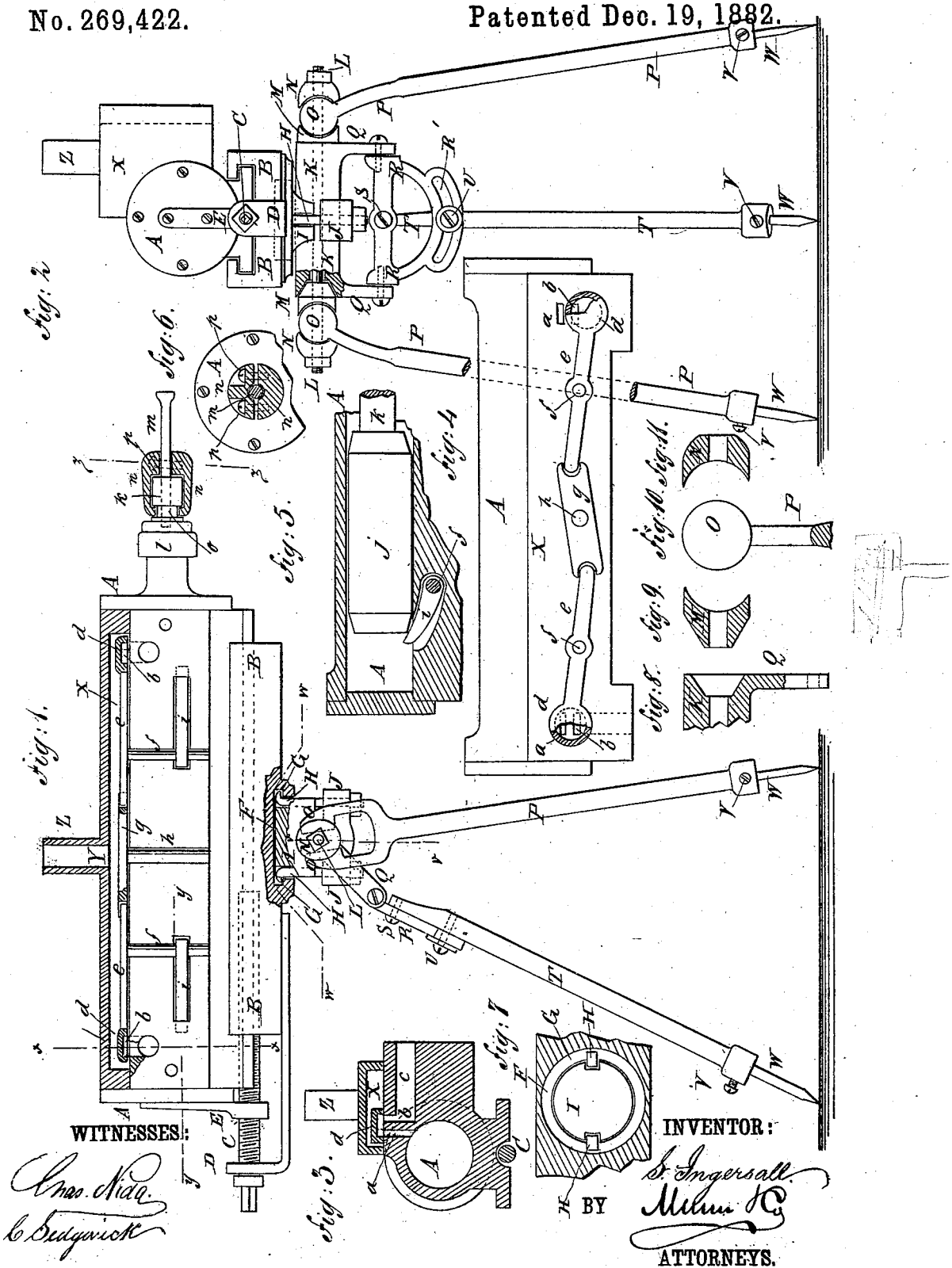

SIMON INGERSOLL, OF STAMFORD, CONNECTICUT, ASSIGNOR TO THE INGERSOLL MANUFACTURING COMPANY, OF SAME PLACE.

STEAM ROCK-DRILL.

SPECIFICATION forming part of Letters Patent No. 269,422, dated December 19, 1882.

Application filed June 14, 1882. (No model.)

*To all whom it may concern:*

Be it known that I, SIMON INGERSOLL, of Stamford, in the county of Fairfield and State of Connecticut, have invented certain new and useful Improvements in Steam Rock-Drills, of which the following is a full, clear, and exact description.

Reference is to be had to the accompanying drawings, forming part of this specification, in which similar letters of reference indicate corresponding parts in all the figures.

Figure 1 is a side elevation of my improvement, shown partly in section and with part of the casing removed. Fig. 2 is a rear elevation of the same, partly in section. Fig. 3 is a sectional end elevation of the same, taken through the line *x x*, Fig. 1. Fig. 4 is a plan view of the cylinder and steam-chest, the cover of the steam-chest being removed and parts of the valves being broken away. Fig. 5 is a sectional plan view of a part of the cylinder, taken through the line *y y*, Fig. 1. Fig. 6 is a cross-section of the drill-bit clutch, taken through the line *z z*, Fig. 1. Fig. 7 is a sectional plan view of the swiveled tripod clamp, taken through the line *w w*, Fig. 1. Figs. 8, 9, 10, and 11 are detail sectional elevations of the parts of a universal joint for one of the tripod legs.

The object of this invention is to promote convenience and security in adjusting steam-rock-drills.

The invention consists in a steam rock-drill constructed with the way-plate that carries the steam-cylinder, connected by bolts having L-heads, and bearing-blocks, with a sleeve, to the ends of which the side legs are connected by universal joints, and which is provided with rigid arms, to which is hinged a slotted frame, having the rear leg secured to it, so that the steam-cylinder and the legs can be readily adjusted in any desired position. Within the steam-chest two valves are attached to the outer ends of two levers, the inner ends of which are connected by an equal-armed lever. The valve-carrying levers are attached to pivots, which are provided with rigid arms projecting into the interior of the cylinder, so that the valves will be operated at the proper times by the movements of the piston.

A represents a steam-cylinder, the T-shaped base of which slides in a groove in a way-plate, B, in the ordinary manner. The cylinder A is moved up and down by operating the feed-screw C, which is swiveled to an arm, D, attached to the way-plate B and passing through the nut E, attached to the cylinder A. The outer end of the feed-screw C is squared to receive a crank, hand-wheel, or other suitable means for operating it.

In the center of the lower side of the way-plate B is formed a circular recess, F, around the inner end of which is formed an annular groove, G, to receive the L-heads of the bolts H. The bolts H are kept in place in the grooved recess F by the upper part or saddle I of the coupling, which has grooves in its sides to receive the said bolts. The bolts H pass through holes in the ends of the lower part, J, of the couplings, and have nuts screwed upon their lower ends. The adjacent faces of the parts I J of the coupling are concaved to receive the sleeve K, through the center of which passes longitudinally the rod L. The ends of the sleeve K are concaved to receive the rounded or conical ends of the inner parts, M, of the couplings for the side legs of the tripod. The rod L also passes through the outer parts, N, of the couplings, and has nuts screwed upon its ends. The adjacent faces of the parts M N are concaved to fit upon the edges of the disks O, formed upon the ends of the prongs of the forked ends of the side legs, P, which disks O are placed upon the opposite sides of and are kept in place by the end parts of the screw-rod L. This construction forms a universal joint, and allows the side legs, P, to be adjusted in any required position. The central coupling allows the cylinder A to be adjusted laterally into any desired position, while the sleeve K and rod L allow it to have a free vertical adjustment.

Upon the end parts of the sleeve K are formed short rigid parallel arms Q, to and between the ends of which are pivoted, by screws or other suitable means, the ends of a semicircular plate or frame, R.

To the center of the straight bar of the frame R is hinged, by a screw or bolt, S, the end of the third or rear leg, T, which is connected with the curved bar of the frame R by a bolt or screw, U, the said bolt or screw passing through a hole in the said leg T and a curved slot, R', in the frame R, so that by loosening the bolt or screw U the leg T can be adjusted laterally into any desired position, while the hinged framed R allows it to have a free vertical adjustment.

In the lower ends of the legs P T P are formed sockets, in which are secured, by set-screws V, steel points W, so that the said points can be readily removed and sharpened. The points W and set-screws V are also useful in leveling the machine.

To the upper side of the cylinder A is attached, or upon it is formed, a steam-chest, X, in the middle part of the outer side of which is formed an opening, Y, provided with a collar, Z, for the attachment of the inlet steam-pipe.

In the end parts of the bottom of the steam-chest X are formed ports $a$, to admit steam into the end parts of the interior of the cylinder A, and at the outer sides of the said inlet-ports $a$ are formed ports $b$, through which the exhaust-steam escapes from the said cylinder A and passes into the outlets $c$ through recesses in the lower sides of the valves $d$. The valves $d$ rest and slide upon the bottom of the steam-chest X, and are formed upon or attached to the outer ends of the short levers $e$, which are rigidly attached to pivots $f$, working in bearings in the side part of the cylinder A. The inner ends of the levers $e$ are rounded and rest in semicircular recesses in the ends of the equal-armed lever $g$, which is attached to the upper end of a pivot, $h$, working in bearings in the side of the cylinder A, so that the levers $e$ will always move at the same time and in opposite directions.

To the lower parts of the pivot $f$ are attached arms or levers $i$, which rest in recesses opening into the interior of the cylinder A, and which incline inward and toward the ends of the said cylinder. The ends of the arms $i$ project into the interior of the cylinder A, so that they will be struck by the piston $j$ as it approaches the end of its stroke, and will be pushed outward. As each arm $i$ moves outward it moves its valve $d$ off the inlet-port $a$ and allows steam to enter the cylinder A in front of the piston $j$, so as to cushion the said piston. The movement of either valve $d$ to uncover an inlet-port moves the other valve $d$ over both ports, so that steam can exhaust in front of the piston $j$ as the said piston begins its return movement, the exhaust at each end of the cylinder being thus opened at the same time as the inlet-port at the other end of the said cylinder.

The piston-rod $k$ is made large, so that only a comparatively small amount of steam can enter the forward end of the cylinder A, and passes out through a stuffing-box, $l$, secured to the said end. The forward end of the piston-rod $k$ is perforated longitudinally to receive the shank of the drill-bit $m$, which is secured in place by the clutch $n$. The forward ends of the two parts of the clutch $n$ have half-round grooves formed in their sides to receive and fit upon the drill-bit $m$. The inner sides of the rear middle parts of the parts of the clutch $n$ are recessed to receive the end of the piston-rod $k$, leaving flanges upon their rear ends to fit into an annular groove, $o$, in the said piston-rod at a little distance from its forward end, as shown in Fig. 1. The parts of the clutch $n$ are drawn together, clamping the drill-bit $m$ and securely connecting it with the end of the piston-rod $k$ by two screws, $p$, passing through the forward end of one part and screwing into the forward end of the other part, as shown in dotted lines in Figs. 1 and 6.

Having thus fully described my invention, I claim as new and desire to secure by Letters Patent—

1. In a steam rock-drill, the combination, with way-plate B, that carries the steam-cylinder A and is provided with a grooved circular recess, F G, of the L-headed bolts G, the bearing I J, and the sleeve K, substantially as herein shown and described, whereby the said way-plate and cylinder are swiveled and hinged to the said sleeve, as set forth.

2. In a steam rock-drill, the combination, with the recessed ends of the sleeve K, with which the way-plate and steam-cylinder are connected, and the side legs, P, provided with forked upper ends, having disks O upon the ends of their prongs, of the bearings M N and the screw-rod L, substantially as herein shown and described, whereby the said legs can be adjusted in any desired position, as set forth.

3. In a steam rock-drill, the combination, with the sleeve K and the rear leg, T, of the hinged frame R, having curved slot R', and the bolts or screws S U, substantially as herein shown and described, whereby the said rear leg will have a free vertical and lateral adjustment, as set forth.

4. In a steam rock-drill, the combination, with the steam-cylinder A and the steam-chest X, of the valves $d$, levers $e$, pivots $f$, and arms $i$, and the connecting-lever $g$, substantially as herein shown and described, whereby the valves will be operated at the same time by the movements of the piston, as set forth.

SIMON INGERSOLL.

Witnesses:
SAMUEL ADAMS,
H. STANLEY FINCH.